United States Patent [19]

Sheppard

[11] Patent Number: 4,870,778
[45] Date of Patent: Oct. 3, 1989

[54] LIVE BAIT AND FISH CONTAINER

[76] Inventor: Harold A. Sheppard, P.O. Box 367, Okay, Okla. 74446

[21] Appl. No.: 243,965

[22] Filed: Sep. 14, 1988

[51] Int. Cl.⁴ .................. A01K 97/00; A01K 97/04
[52] U.S. Cl. ............................................ 43/55; 43/56
[58] Field of Search ................... 43/54.1, 55, 56, 105

[56] References Cited

U.S. PATENT DOCUMENTS

| | | | |
|---|---|---|---|
| 292,123 | 1/1884 | Lindsay | 43/55 |
| 1,446,612 | 2/1923 | Brenneman | 43/55 |
| 1,719,591 | 7/1929 | Collins | 43/55 |
| 2,603,028 | 7/1952 | Roberts | 43/55 |
| 2,661,116 | 12/1953 | Bombarger | 43/55 |
| 2,797,524 | 7/1957 | Nelson . | |
| 4,079,698 | 3/1978 | Neff et al. | 43/55 |
| 4,671,008 | 6/1987 | Lindemood | 43/54.1 |
| 4,724,631 | 2/1988 | Wang | 43/55 |

Primary Examiner—Richard K. Seidel
Assistant Examiner—William S. Andes

[57] ABSTRACT

In a buoyant fish and live bait container a pair of downwardly open box-like sections are hingedly connected in end abutting relation. Flexible fabric screen or netting material defining an upwardly open box-like receptacle is secured at its upper edge portions to the respective half sections. The receptacle is transversely divided to form bait and catch holding chambers with access thereto through openings in each half section and the receptacle bottom wall of the respective chamber.

5 Claims, 2 Drawing Sheets

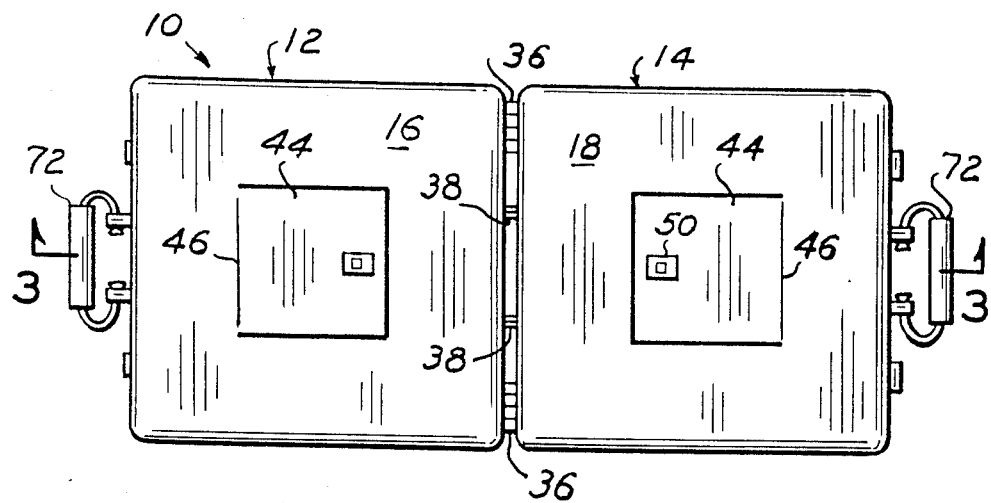
FIG. 2
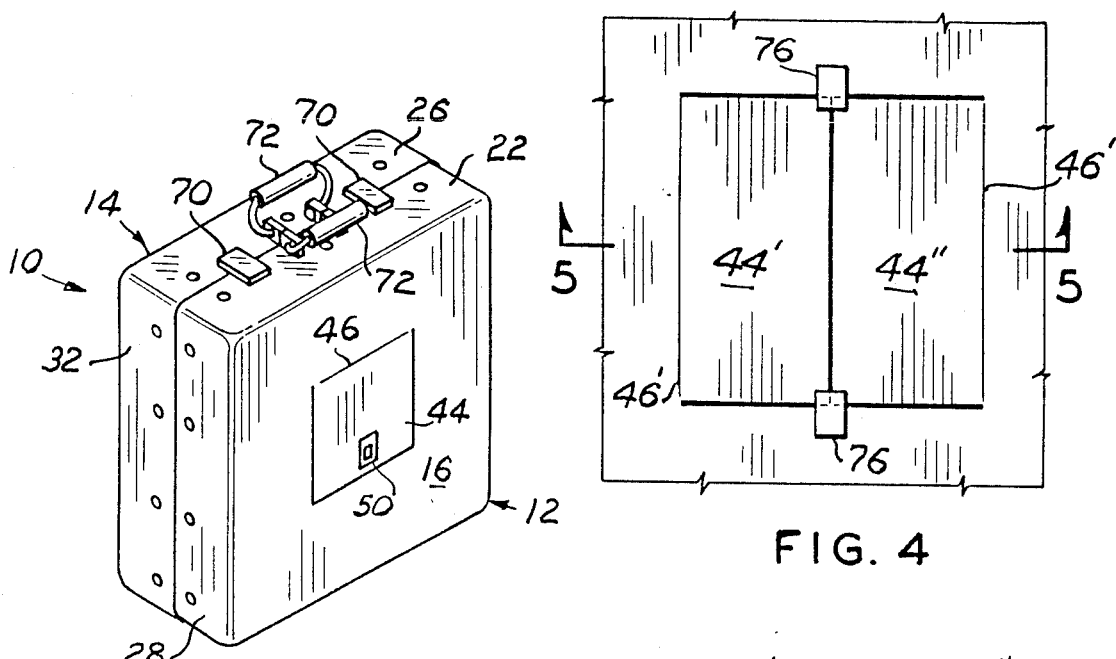
FIG. 4
FIG. 1
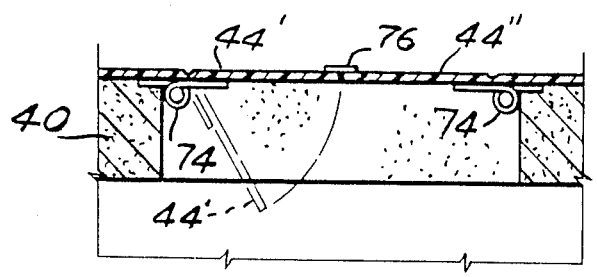
FIG. 5

LIVE BAIT AND FISH CONTAINER

BACKGROUND OF THE INVENTION

1. Field of the Invention

This invention relates to containers and more particularly to a buoyant folding and wall collapsible container for temporary storage of live fish bait while fishing.

It is common practice among fishermen to use live bait and to aerate the water containing the bait, however, such aerated containers are usually relatively small and in hot weather the water becomes warm even with aerating and it is, therefore, desirable to provide a live fish bait container which utilizes the water in the lake or stream being fished for maintaining the bait alive and to provide a temporary storage area for the catch, both being accessible by the fisherman while fishing.

This invention provides such a container.

2. Description of the Prior Art

The most pertinent patent is believed to be U.S. Pat. No. 2,797,524 which discloses a metallic collapsible container, including hinged together half sections, equipped with buoyant means for causing it to float near the top of a body of water. The container is readily collapsed from an open box-like character to a flat closed compact arrangement easily carried from place to place. The container includes bellowslike sides, folding end members and a bottom.

This invention is distinctive over this patent by being formed from lightweight plastic material and is transversely divided to form a pair of bait and catch containing compartments.

SUMMARY OF THE INVENTION

A pair of rectangular box-like sections are arranged in end to end abutting relation when unfolded to an operable position with hinges joining the two sections for movement about a hinge axis lying in the plane common to the half sections side wall and end edges depending from the respective planar box-like top. A flexible screen material, upwardly open box-like collapsible member, is connected by the upper limit of its side wall and end panels with the side walls of the sections and the end walls thereof opposite the hinge connection. The screen material side wall and end panel are joined by a horizontal bottom. A partition transversely divides the screen container to form two chambers, each having a bottom opening. Each half section contains a layer of buoyant material for maintaining the half section planar panels adjacent the surface of the body of water when disposed therein. Each of the half sections and buoyant material are cooperatively apertured vertically for access to the interior of the fish containing screen material container.

In one embodiment, gravity closed flap doors normally close the half section openings.

In an alternative embodiment, downwardly movable spring return cooperating door-like panels close the respective half section opening and are normally spring biased to a closed position.

Handles and latches are connected with the end of the respective half section opposite the hinge position and secure the two half sections together and provide carrying handles when the screen wall member and half sections are folded to a stored or travel position.

The principal object of this invention is to provide a fish bait and catch container readily expanded from a closed storage and transport position to an expanded position which floats adjacent the surface of a body of water and includes chambers for live fish bait and the catch which is easily accessed by the fisherman.

BRIEF DESCRIPTION OF THE DRAWINGS

FIG. 1 is a perspective view of the container when collapsed to a storage position;

FIG. 2 is a top view, to a larger scale, of the container half sections when unfolded to an operable floating position;

FIG. 4 is a fragmentary top view, to another scale, of an alternative embodiment of the access doors; and, FIG. 5 is a fragmentary vertical cross sectional view taken substantially along the line 5—5 of FIG. 4.

DESCRIPTION OF THE PREFERRED EMBODIMENTS

Figure 3:
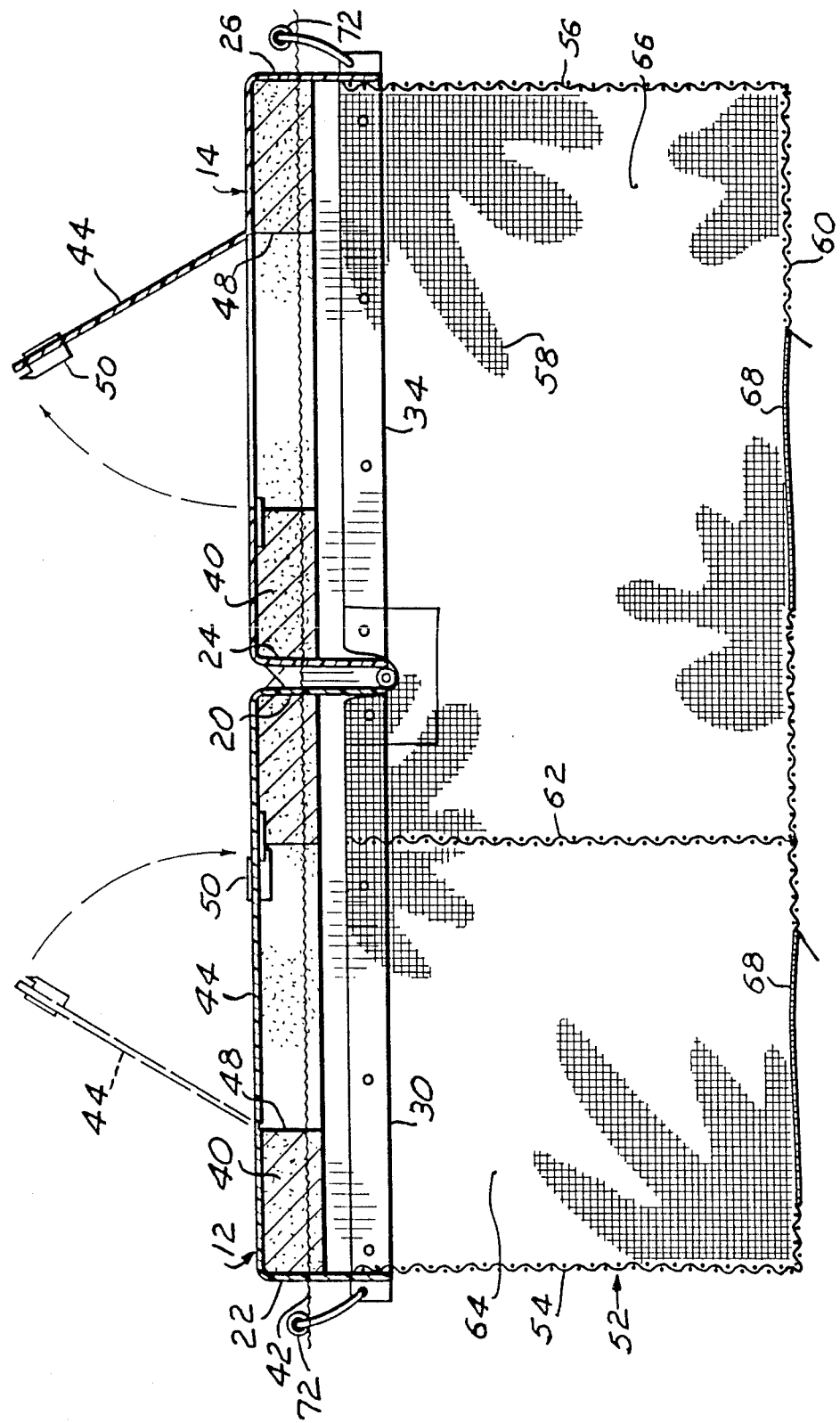
FIG. 3 is a vertical cross sectional view, to a larger scale, taken substantially along the line 3—3 of FIG. 2 and illustrating the chamber access doors in open position by solid and broken lines.

Like characters of reference designate like parts in those figures of the drawings in which they occur.

In the drawings:

Referring first to FIGS. 1 to 3, the reference numeral 10 indicates my container which is attache case-like in its folded or stored position (FIG. 1) and elongated rectangular box-like in its unfolded operative position (FIG. 3). The container 10 comprises two substantially square box-like half sections 12 and 14 disposed in end to end abutting relation when unfolded to form the elongated rectangular box-like configuration of FIG. 3. Each of the two half sections are substantially identical having planar top panels 16 and 18, as viewed in FIG. 2, integral with end walls 20-22 and 24-26 including opposing side walls 28-30 and 32-34. The edges of the end walls 20 and 24 ar secured by a pair of interdigitated hinges 36 for joining the two half sections together for movement about the axis of the hinges toward and away from each other.

Bumpers 38, secured to the outer surface of the end walls 20 and 24, respectively, contacting the opposing adjacent wall in cooperation with the hinges 36 normally maintain the planes of the panels 16 and 18 in a common plane and similarly the depending edges of the respective side and end walls in a parallel plane spaced below the plane of the panels. Each of the half sections 12 and 14 contain an equally dimensioned layer of buoyant material 40 of predetermined thickness, preferably approximately one-half the transverse width of the respective half section side and end wall for the purposes presently explained, sufficient to maintain the upper edge portion of each half section above the surface of the body of water, indicated at 42. Each of the half sections 12 and 14 are further characterized by a generally centrally disposed flap door 44 integrally joined to the panel along one edge 46 to form a hinge for vertical pivoting movement of the respective door.

The buoyant material 40 is cooperatively vertically apertured, as at 48, for the purposes presently apparent.

Each of the doors 44 are provided, at their edges opposite the hinge 46, with a spring urged catch 50 slidable toward and away from the edge defining the door opening opposite the hinge for normally maintaining the door in closed position.

A box-like fabric screen material panel assembly, forming a receptacle 52, depends from the half sections 12 and 14. The receptacle comprises end walls 54 and 56 respectively connected at their upper edge portion to the depending edge portion of the half section end walls 22 and 26 and similarly includes side walls 58, only one being shown, similarly connected to the half section side walls 28-30 and 32-34. A fabric screen bottom wall 60 joins the fabric screen walls 54-56 and 58. A fabric screen partition 62 transversely divides the receptacle 52 to form a live bait containing chamber 64 and a catch chamber 66. Additionally, the fabric screen bottom 60 is provided with longitudinally extending openings normally closed by conventional zippers 68 to form bottom wall exits, when opened, for live bait and fish.

The half section ends 22 and 26 are each provided with cooperating conventional latches 70 for securing the half sections together when in folded position (FIG. 1). Additionally, the half sections are each provided with a handle 72 for carrying the device when folded.

Referring now to FIGS. 4 and 5, an alternative embodiment of the flap doors is illustrated which comprises a pair of doors 44' and 44" similarly, each having an edge integral with the supporting panel forming a hinge 46'. The undersurface of the half section panel is provided with door closing springs 74 permitting each or both of the doors 44' and 44" to be biased downwardly, as illustrated by broken lines (FIG. 5) wherein the hinge springs 74 biases the door or doors to a closed position. The upward door closing action being arrested by stops 76 secured to the upper surface of the half section panel and overlapping the meeting edge at the respective ends of the doors 44' and 44".

OPERATION

In operation, the device 10 is transported to the body of water to be fished in its folded position of FIG. 1. The fisherman unfolds the half sections to the position of FIG. 2 and places the device in the body of water 42 wherein gravity and water currents normally dispose the receptacle 52 in its downwardly expanded position of FIG. 3. Live bait is placed in the chamber 64 through the door 44 and any fish caught is placed in the chamber 66. Either of the handles 72 may be utilized for mooring the device 10 to a boat, dock or a selected fixed object on the bank. If at the end of the fishing session the fisherman prefers releasing his bait into the water and/or the catch, particularly if small, the zippers 68 are opened allowing the fish and bait to exit the receptacle 52 in a downward direction which may be accelerated by lifting the half sections out of the water.

When removed from the water, the fabric screen receptacle 52 is manually collapsed to occupy the space between the buoyant material members 40 when the half sections are folded together.

Obviously the invention is susceptible to changes or alterations without defeating its practicability. Therefore, I do not wish to be confined to the preferred embodiment shown in the drawings and described herein.

I claim:

1. A fish and live bait container, comprising:
    a pair of end abutting box-like half sections each having a planar panel and depending side and end walls hingedly connected along the respective abutment surface for folding and unfolding movement of the two halves about an axis lying in a plane common to the lower edge surfaces of the side and end walls;
    a box-like plastic screen material collapsible panel assembly having a bottom wall and vertical side and end walls respectively secured at their upper limit to the depending edge portions of said half sections side walls and the end walls remote from the abutted surfaces;
    a partition transversely dividing said panel assembly for forming a pair of chambers;
    means including a flap door supported by each said half section providing access to the interior of said chambers; and,
    an elongated normally closed opening in said bottom wall on opposing sides of said partition.

2. The container according to claim 1 and further including:
    buoyant means attached to each said half section for maintaining said half section planar panels adjacent the surface of a body of water when disposed therein.

3. The container according to claim 2 in which at least one half section planar panel is provided with a generally central vertical opening and said access means comprises:
    a pair of spring biased normally closed doors hingedly connected for vertical pivoting movement by one edge portion with an edge portion of the half section defining the opening.

4. The container according to claim 3 in which the buoyant means comprises:
    a section of closed cell plastic material underlying each said planar panel and having a vertical aperture of equal area and in register with the door opening.

5. The container according to claim 4 and further including: p1 latch means on the ends of said half sections opposite the hinge for joining said half sections when folded toward each other; and,
    handle means adjacent said latch means.

* * * * *